US009397768B2

(12) United States Patent
Moulsley et al.

(10) Patent No.: US 9,397,768 B2
(45) Date of Patent: *Jul. 19, 2016

(54) METHOD FOR OPERATING A RADIO STATION IN A MOBILE NETWORK

(71) Applicant: KONINKLIJKE PHILIPS N.V., Eindhoven (NL)

(72) Inventors: Timothy James Moulsley, Caterham (GB); Milos Tesanovic, Harrow (GB); Choo Chiap Chiau, Shanghai (CN); Robert James Davies, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/824,109

(22) Filed: Aug. 12, 2015

(65) Prior Publication Data
US 2015/0349902 A1 Dec. 3, 2015

Related U.S. Application Data

(63) Continuation of application No. 12/858,933, filed on Aug. 18, 2010, now Pat. No. 9,113,480.

(30) Foreign Application Priority Data

Aug. 18, 2009 (EP) .................................... 09168117
Apr. 6, 2010 (EP) .................................... 10305350

(51) Int. Cl.
*H04W 72/08* (2009.01)
*H04B 17/309* (2015.01)
(Continued)

(52) U.S. Cl.
CPC ............ *H04B 17/309* (2015.01); *H04B 7/0413* (2013.01); *H04L 5/0091* (2013.01); *H04W 24/10* (2013.01); *H04W 84/042* (2013.01)

(58) Field of Classification Search
CPC . H04B 17/309; H04B 7/0413; H04W 84/042; H04W 24/10; H04L 5/0091
USPC .......................................... 370/252, 329, 431
See application file for complete search history.

(56) References Cited

U.S. PATENT DOCUMENTS 7,574,179 B2    8/2009  Barak et al.
8,150,345 B2    4/2012  Roy et al.
(Continued)

FOREIGN PATENT DOCUMENTS

JP    2008538487 A    10/2008
WO   2005104399 A1   11/2005
(Continued)

OTHER PUBLICATIONS

Qualcomm Europe, "Advantages of CoMP Operation for Delay Sensitive Traffic in CSG Environment", 3GPP Draft, R1-029694, Jun. 2009, pp. 1-8.
(Continued)

*Primary Examiner* — Phuc Tran

(57) ABSTRACT

The present invention relates to a method for operating a secondary station comprising means for communicating with a primary station, the method comprising receiving from the primary station an interference status report, said interference status report comprising an spatial indication being representative of a spatial characteristic of the interference, measuring channel characteristics on reference symbols, and interpreting the measured channel characteristics with help of the interference status report.

19 Claims, 1 Drawing Sheet

(51) Int. Cl.
*H04B 7/04* (2006.01)
*H04L 5/00* (2006.01)
*H04W 24/10* (2009.01)
*H04W 84/04* (2009.01)

(56) References Cited

U.S. PATENT DOCUMENTS

| | | | |
|---|---|---|---|
| 8,190,163 B2 | 5/2012 | Laroia et al. | |
| 8,325,624 B2 | 12/2012 | Hammarwall et al. | |
| 2005/0238111 A1* | 10/2005 | Wallace | H04B 7/0615 375/267 |
| 2006/0094373 A1* | 5/2006 | Hottinen | H04B 7/0617 455/73 |
| 2006/0211441 A1* | 9/2006 | Mese | H04W 52/243 455/522 |
| 2006/0233131 A1 | 10/2006 | Gore et al. | |
| 2008/0233967 A1* | 9/2008 | Montojo | H04W 72/082 455/452.2 |
| 2008/0274745 A1* | 11/2008 | Barak | H04W 16/02 455/447 |
| 2009/0109939 A1* | 4/2009 | Bhushan | H04W 72/082 370/337 |
| 2009/0197631 A1 | 8/2009 | Palanki et al. | |
| 2009/0296788 A1 | 12/2009 | Hottinen | |
| 2010/0296385 A1 | 11/2010 | Li | |
| 2010/0323625 A1 | 12/2010 | Kishigami et al. | |
| 2012/0020319 A1 | 1/2012 | Song et al. | |

FOREIGN PATENT DOCUMENTS

| | | |
|---|---|---|
| WO | 2009007722 A1 | 1/2009 |
| WO | 2010088662 A2 | 8/2010 |
| WO | 2010088664 A2 | 8/2010 |

OTHER PUBLICATIONS

Qualcomm Europe, "Signaling for Spatial Coordination in DL CoMP", 3GPP Draft, R1-092057, Apr. 28, 2009, pp. 1-10.
Motorola, "CoMP Operation Based on Spatial Covariance Feedback and Performance Results of Coordinated SU/MU Beamforming", 3GPP Draft, R1-09243, Jul. 7, 2009, pp. 1-11.
Philips, "DL MIMO for LTE-A: Interference Management Aspects", 3GPP Draft, R1-093554, Aug. 19, 2009, 3 Pages.

* cited by examiner

METHOD FOR OPERATING A RADIO STATION IN A MOBILE NETWORK

CLAIM OF PRIORITY

The present application is a continuation of U.S. patent application Ser. No. 12/858,933, filed Aug. 18, 2010, which claims the benefit of European Patent Applications EP09168117.1, filed Aug. 18, 2009 and EP10305350.0, filed Apr. 6, 2010 which are incorporated by reference herein in their entirety.

FIELD OF THE INVENTION

The present invention relates to a method of communication in a communication system like a mobile communication system, for example UMTS, LTE or LTE Advanced.

More specifically, the invention relates to a method of communication using beamforming and, in some exemplary embodiments of the invention, cooperative beamforming, i.e. beamforming obtained by using primary station antennas from different cells.

BACKGROUND OF THE INVENTION

In a cellular telecommunication system as illustrated in FIG. 1, like a UMTS or LTE system, a plurality of secondary stations 110a-d like User Equipments, communicate within a cell 100a with the primary station 101a operating the cell. In such a system, the primary station 101a and the secondary stations may each comprise an antenna array comprising a plurality of antennas. These antennas may be used to communicate in a MIMO mode by beamforming. Complex coefficients applied on the transmitting antennas of the transmitting station, here the primary station 101a and/or on the receiving station, here the secondary stations 110a-d enable the creation communication streams each of which are associated with one or more spatial channels.

In order to provide to the primary station 101a with knowledge of transmission conditions experienced by the secondary stations so that a suitable transmission mode is selected, the secondary stations may measure some parameters like attenuation, SINR, interference etc. . . . . Then, the secondary stations may feedback reports representative of these conditions like an achievable data rate (as in CQIs) or indication of propagation loss.

However, the secondary station computes this kind of feedback on the basis of its local measurements, although it has no overview of the network nor of the whole system resources.

SUMMARY OF THE INVENTION

It is an object of the invention to propose a method of operating a system which alleviates the above mentioned problem.

It is another object of the invention to propose a method of operating a system which enables the secondary station to have a better knowledge of its environment.

It is still another object of the present invention to propose a method of operating a system that enables the secondary stations to be aware of the interference sources without causing a huge cost of overhead.

To this end, in accordance with a first aspect of the invention, a method is proposed for operating a primary station comprising means for communicating with a plurality of secondary stations, the method comprising the step of the primary station signalling to at least one secondary station an interference status report, said interference status report comprising an spatial indication being representative of a spatial characteristic of the interference.

In accordance with a second aspect of the invention, a method is proposed for operating a secondary station comprising means for communicating with a primary station, the method comprising receiving from the primary station an interference status report, said interference status report comprising an spatial indication being representative of a spatial characteristic of the interference, measuring channel characteristics on reference symbols, and interpreting the measured channel characteristics with help of the interference status report.

In accordance with a third aspect of the invention, a primary station is proposed comprising means for communicating with a plurality of secondary stations, the primary station comprising a transmitter for signalling to at least one secondary station an interference status report, said interference status report comprising an spatial indication being representative of a spatial characteristic of the interference.

In accordance with a fourth aspect of the invention, a secondary station is proposed comprising means for communicating with a primary station, the secondary station comprising a receiver for receiving from the primary station an interference status report, said interference status report comprising an spatial indication being representative of a spatial characteristic of the interference, control means for measuring channel characteristics on reference symbols, the control means being adapted for interpreting the measured channel characteristics with help of the interference status report.

As a consequence, the secondary station has an indication on the spatial shape of the interference, like the spatial distribution of the interference. In an exemplary embodiment of the invention, the spatial indication comprises an indication on how localised is an interference. Thus, the secondary station may take this into account when estimating an achievable data rate. Moreover, the primary station is able to have a good view on the spatial distribution of the interference, and on the characterization of such interferences. Indeed, most of the interference is due to the neighboring cells and it is common that a primary station operates for at least two cells.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
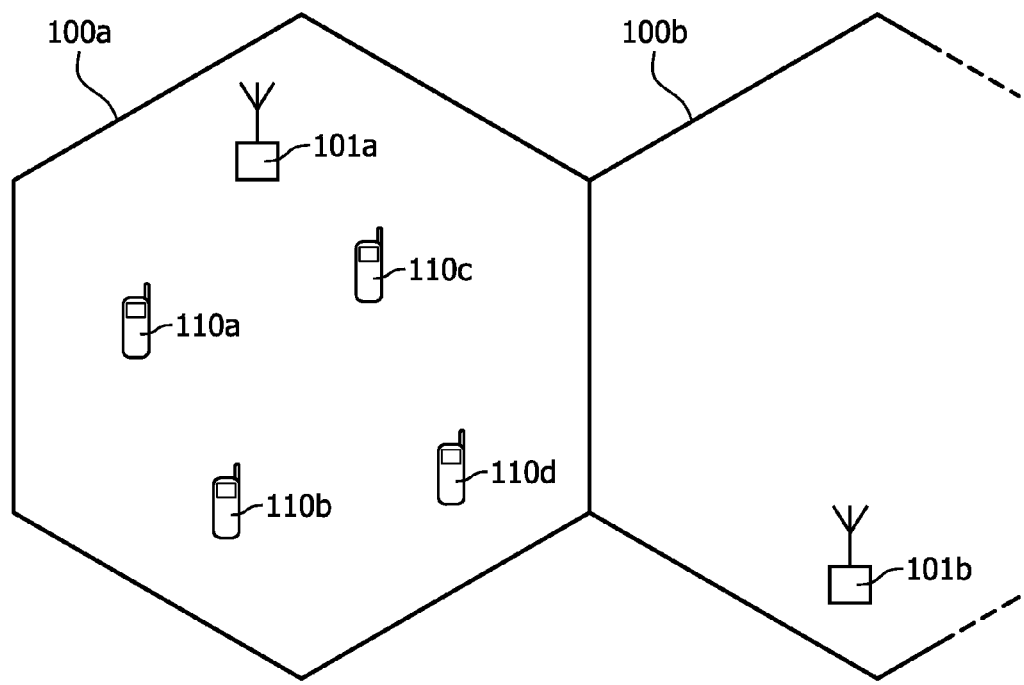
FIG. 1, already described, is a block diagram of a mobile network in which the invention is implemented.

The present invention relates to a mobile communication network as a UMTS or a LTE network, where each cell is operated by a primary station, which communicates with a plurality of secondary stations. Downlink communications from the primary station are carried out on a plurality of channels, some channels being dedicated to user data, and other channels to control data for signalling of transmission parameters for controlling the communications from the primary station to the secondary station. The channels may be defined by multiplexing of one or more of time, frequency or code. The same applies for uplink channels.

In an exemplary embodiment based on the LTE example, a single carrier of up to 20 MHz is used. A control signalling message for example on the Physical Downlink Control Channel (PDCCH) may be used to signal allocations of transmission resources. On the PDCCH, the primary station may signal transmission parameters, e.g. precoding vectors/matrices which allow the secondary station (or User Equipment noted UE) to compute phase reference(s) for demodulation of downlink data from common reference symbols. Reference symbols that are precoded specifically for a considered secondary station (UE specific Demodulation Reference Symbols or UE specific DRS) are also supported as an option, but only for a single spatial channel. A spatial channel may be defined by the combination of transmission parameters like a modulation sequence, a time/frequency resource, and/or a beamformed stream.

In the advanced forms of LTE networks, UE specific DRS are also proposed to aid reception of downlink data transmissions from the primary station. The DRS may occupy some of the resource elements (REs) in each resource block. Transmission of multiple spatial channels to a secondary station would require a set of DRS for each spatial channel. The set of DRS for each spatial channel is precoded in the same way as the data for that spatial channel, and since the locations and symbol values of the DRS are known to the secondary station, they can be used as a phase and amplitude reference for demodulation of data transmitted on that spatial channel. Equivalently, the DRS can be used to obtain a channel estimate of the combined channel formed by the precoding and the radio channel. The precoding for a spatial channel can be considered to create an antenna port and the set of DRS for that spatial channel are thus transmitted on the corresponding antenna port.

The set of DRS for each spatial channel could be distinguished by one or more of:
Frequency domain (FDM) i.e. the REs used for sending DRS differ in the frequency domain with e.g. different frequency carriers;
Time domain (TDM) i.e. the REs used for sending DRS differ in the time domain;
Different sequences of values transmitted in each of REs used for sending DRS (i.e. CDM). In this case it would be convenient to use the same set of REs for sending each set of DRS for each spatial channel.

In practice the DRS for a given spatial channel may comprise aspects of all three: FDM, TDM, and CDM. For a given secondary station, it would be advantageous if no data is sent (on any spatial channel) in any RE used for DRS since this would avoid any interference between data and the DRS which would otherwise reduce the accuracy of the channel estimate obtained by the secondary station. For FDM, TDM and CDM this would imply that the REs used for any DRS are not available for data on any spatial channel.

Moreover, in accordance with an example of this embodiment, the sets of DRS are mutually orthogonal so that independent channel estimates can be obtained in the case that more than one set of DRS are transmitted at the same time. Two sets of DRS are orthogonal when their product equals zero. For instance, in case of TDM, two symbols are orthogonal if they are not overlapping in time. For FDM, two symbols are orthogonal if their respective frequency carriers are different. For CDM, two symbols are orthogonal if the product of their respective modulation sequences equals zero. In principle the maximum number of spatial channels which could be supported for a single Resource Block would depend on the modulation order and the total number of REs allocated for DRS (i.e. maximum number of orthogonal sequences available). In practice the maximum is likely to be set at a lower level, for example such that the total number of REs allocated to DRS is equal to a multiple of the maximum number of allowed spatial channels, e.g. a set of 2 DRS for each spatial channel.

Then, the following are among the possible ways of designing the system:
The number REs allocated for DRS is proportional to the number of spatial channels actually transmitted to a secondary station UE. This would be applicable for FDM or TDM. It has the advantage of minimising the overhead from DRS when fewer spatial channels are transmitted than the maximum.
The number REs allocated for DRS is fixed (e.g. as a multiple of the maximum number of spatial channels which may be transmitted to a secondary station). This would be a natural consequence of using CDM. For FDM and TDM as well as CDM it would also allow different spatial channels to be transmitted to more than one secondary station simultaneously. This would require that a UE was aware of which set of DRS it should use as references for receiving its data (and which DRS corresponded to which part of the data stream).

However, as illustrated on FIG. 1, a secondary station 110d at the edge of cell 100a may receive DRS simultaneously from more than one cell, here from cell 100b. In this case it is convenient to operate the system such that the same frame timing is used in adjacent cells and also such that DRS from different cells can be distinguished (e.g. by FDM/TDM/CDM). If the secondary station 110d can identify different DRS from different cells 100a or 100b, and has multiple receive antennas then it open the following possibilities:
in an example, the secondary station 110d may receive a data transmission from a wanted cell and adjust its receive weights to reject the spatial channels from other cells.
on the contrary, the secondary station 110d may adjust its receive weights for receiving simultaneously data transmissions from a plurality of cells, here 100a and 100b (e.g. using different spatial channels and different DRS).

Thus, it is advantageous for the secondary station to be able to distinguish DRS from different cells using different symbol sequences, as long as this would not increase the number of REs needed for DRS. However the performance of this approach is lower with rapidly changing channels. As an example, it is proposed in accordance with an embodiment of the invention, that the DRS from different cells are orthogonal (or nearly orthogonal).

In the particular example of LTE, an implementation of such a system would be as follows:
The maximum number of spatial channels which may be transmitted to one UE in one cell is 8. Note that in itself this would limit the total number of spatial channels being transmitted in a cell.
The number of REs for DRS in one Resource Block may be a number such as 12 or 24.
It is assumed that the DRS design will allow some interpolation of the channel coefficients across one Resource Block, at least in some circumstances.

In such a system, the secondary station may have multiple receive antennas (e.g. 2, 4 or 8) in an antenna array. The term antenna port is also used for defining for example a set of antennas used for receiving or transmitting a single stream with a single reference symbol.

In order that the primary station can schedule downlink data transmissions to be make efficient use of system resources, a secondary station is typically expected to provide the primary station with feedback on the downlink channel state, for example:—
  Implicit feedback, under the assumption of a particular transmission scheme, comprising one or more of:
    Preferred transmission rank
    Preferred precoding matrix or vector(s)
    Data rate that could be received (e.g. CQI)
  Explicit feedback, comprising one or more of:—
    Channel transfer function
    Interference power
    Interference covariance matrix Such feedback would typically be based on observation of periodically transmitted reference symbols designed for this purpose (i.e. CSI-RS), and estimates of interference. The feedback may be broadband (e.g. covering the entire carrier bandwidth) or frequency selective, covering parts of the carrier bandwidth.

Different assumptions are possible for the interference, for example:
  Spatially white meaning that the interference level is substantially spread all around the secondary station;
  Spatially localized meaning that the interference level is only high at some locations around the secondary station;
  Uniform in the frequency domain;
  Frequency selective;
  Constant in the time domain, or
  Time varying The secondary station could determine appropriate assumptions itself by observation of the signals at its antenna outputs. Then, if the interference is spatially localised, the secondary station may be able optimize receiver processing (i.e. selection of antenna weights) in order to mitigate the effect of the interference and maximise SINR. Otherwise the secondary station should apply MRC (Maximum Ratio Combining). Calculation of antenna weights would be based on an estimate the spatial signature of the interference at the secondary station. These weights could be applied to reception of data transmissions as well as reporting the channel quality (e.g. CQI).

If the interference is frequency selective or time varying (e.g. with an identifiable pattern), this would lead to higher CQI values corresponding to parts of the spectrum with lower estimated interference.

One problem with using only the secondary station measurements is that interference environment in any future subframes may be different to that derived from past history.

Note that in practice the spatial characteristics of the interference may be more complex, for example multiple localised sources, or a combination of localised and spatially white components. This information may be in the form of a covariance matrix.

In accordance with a first embodiment of the invention, in a system as shown on FIG. 1, the primary station 101 may transmit to one or more of the secondary stations 100a-d in its cell information regarding the spatial distribution of the interference. This information may be enclosed in an interference status report. Such an interference status report may comprise the whole covariance matrix computed by the primary station or based on the reports from the secondary stations. However, such covariance matrix may represent too much overhead. As a consequence, it is proposed in some variants of the invention explained below to provide with other type of interference report.

The primary station has indeed a better knowledge of the interference, and more power to measure such interference. The knowledge may be acquired from measurements or from the reports of the other secondary stations.

The reports may be a representation of the spatial distribution of the interference, for instance by giving some directions or locations of high level of interference. However, in order to minimise the size of the reports, it is also possible to provide some short reports (in combination or alone with long reports) indicative of whether the interference is localized or spread all around the secondary station in a uniform manner. In complement with the indication that interference is localized, a useful indication is the number of localized interference sources.

Since the situation may be a combination of uniform interference with localized sources, the interference reports may be in two parts to indicate this. A first part that could indicate the level of uniform interference, and a second part indicative of the number of localized sources which are to be taken into account along the spatially uniform interference source.

Figure 2:
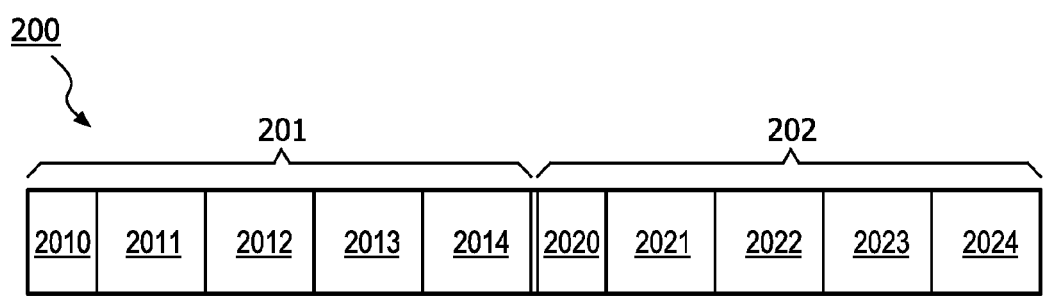
FIG. 2 is a schematic view of an interference report as transmitted in an exemplary embodiment.

As shown on FIG. 2, an example of interference report 200 comprises a uniform interference field 201 dedicated to the spatially uniform interference providing with for instance levels of interference. These values may be on average over the whole bandwidth or over subbands 2011-2014 as shown on FIG. 2. Values equal to zero may indicate that no uniform interference is encountered in this particular subband. In order to reduce the size of the report, the size may be dynamically reduced with a uniform interference indicator 2010, which depending on its value may indicate the presence/absence of the subsequent fields.

A second field 202 may be representative of the localized components of the interference. Similarly, a localized interference indicator 2020 may indicate the presence/absence of the subsequent fields or indicate the number of localized interference sources. Thus, it defined the number of subsequent fields to describe all the sources. The subsequent fields 2021-2024 are representative of a general direction from the secondary station or from the primary station of at least some of the localized interference sources. Here, four sources general directions are given in the subfields 2021-2024.

As a variant, it is possible to indicate which frequency subbands of the bandwidth are experiencing spatially uniform interference. It is as well possible to indicate on which sub bands of a frequency domain the interference report is applicable, and for which period. A timing indication may be representative of a validity period of the report or of the time at which the report was estimated. Thus, the secondary station may derive a confidence level from the timing indication and have a derived assumption if the report is not recent.

The timing indication may also indicate a variation rate of the interference spatial distribution, which permits to the secondary station to derive a time of validity of the report. Moreover, if the interference are periodical, this timing indication may be a periodicity of the interference spatial distribution.

With help of this interference status report, the secondary station may then make some measurements based on the indications of the report, for instance measurements on reference symbols. These measurements may be used for sending an estimate of an achievable data rate and the preferred transmission parameters, like CQI, to the primary station.

In a variant of this embodiment, the secondary station may use the interference status report to optimize its receiving weights for a MIMO communication with the primary station. Indeed, the indication of the location of the interference sources may permit to compute weights reducing the sensitivity of reception in a particular direction.

In accordance with embodiments of the invention, it is proposed that the secondary station is given assistance in determining assumptions about the interference environment by the primary station. This is feasible since much of the interference experienced by the UE is under the control of the primary station, arising for example, from transmissions in other cells controlled by the same primary station, or on spatial channels transmitted to other UEs in the same cell. In addition the primary station may have some knowledge of interfering transmissions generated by cells controlled by other primary stations. For example, some forms of interference co-ordination may lead to restricting high power transmissions in a given cell to a particular part of the frequency domain.

Providing the secondary station with the full interference covariance matrix (even if it was known at the primary station) would lead to significant overhead. More compact representation of information is required.

Therefore, in accordance with an embodiment of this invention, the primary station could signal to the secondary station on of the following:—
  Whether the interference should be assumed to be spatially uniform or spatially localised
    The parts of the frequency domain over which it should be assumed to be spatially uniform
    The parts of the frequency domain over which it should be assumed to be spatially localised
  In addition, other interference characteristics could be indicated:—
    The number of spatially localised interference components
    Whether the interference should be assumed to be a mixture of localised and spatially white components
    Whether the interference should be assumed to be uniform in the frequency domain or frequency selective. Or in more detail:
      The parts of the frequency domain over which it should be assumed to be uniform
      The parts of the frequency domain over which it should be assumed to be frequency selective
    Whether the interference should be assumed to be uniform in the time domain or time varying. Or in more detail
      The periodicity of interference variation.
      The timing of the interference variation
    The time interval over which particular assumptions should be maintained The secondary station can derive useful information on the interference environment by monitoring the various DRS sequences. Typically, if a spatial channel is being transmitted in a given cell (or a nearby cell) the channel estimate derived from the corresponding DRS sequence could give an indication of the presence of a corresponding interfering data transmission. On the other hand if the spatial channel is not being transmitted, the channel estimate should be interpreted as an indication of background noise or spatially white interference power. Therefore it could be advantageous for the primary station to signal to the the secondary station whether particular DRS sequences should be assumed to correspond to transmitted spatial channels or assumed to be background noise. This would be particularly relevant if particular DRS sequences were used preferentially (e.g. more or less continuously, or over a wide bandwidth in a particular cell).

For receiving a single spatial channel in the presence of spatially white interference the UE would be expected to use the channel estimate derived from measurements on the associated DRS sequence to provide a phase and amplitude reference for demodulation. In this case, for multiple receive antennas at the secondary station, antenna weights derived assuming MRC would be appropriate. However, in the presence of additional spatial channels and/or spatially non-uniform interference different antenna weights would provide a better SINR. To compute suitable antenna weights the UE can use the DRS sequences associated with the other spatial channels on which it is receiving data, and any estimate of the spatial characteristics of the interference, which could be derived from the associated DRS sequences. Therefore, to improve UE receiver performance the primary station can provide information on the interference characteristics, such as an indication of:—
  the DRS sequences which are also being used in the same cell (e.g. a serving cell or anchor cell) for transmission to other UEs
  the DRS sequences which are being used in adjacent cells for transmission to other UEs Such indications could inform the UE whether it should assume that its own measurements of particular DRS sequences are to be interpreted on the basis of spatially white interference or on the basis of spatially localised transmissions.

If the information on DRS sequences in use is carried together with a downlink assignment in PDCCH, this could also imply a particular part of the frequency spectrum (e.g. the resources in the assignment message). It could also indicate a particular part of the time domain (e.g. the subframe of the corresponding PDSCH or a number of subsequent subframes).

The information on interference could be broadcast to all UEs, but it would then need to reflect average conditions in a cell.

In the case of carrier aggregation the information on interference could be specific to particular component carriers.

Informing the UE of the DRS sequences in use is equivalent to providing an indication of the number of localised spatial interference sources.

The information on interference may be provided to the UE in response to a request from the UE.

In another example of the invention based on a system like LTE, the UE is informed by signalling (or can deduce) the number of downlink antennas available in a cell, and the set of DRS sequences which are potentially available. The UE is informed by higher signalling from the primary station (e.g. using a bitmap with one bit per resource block) if the interference in a particular resource block should be assumed to be spatially localised (e.g. bit map value set to "1") or not (e.g. bit map value set to "0"). If the interference is indicated to be not spatially localised the UE derives CSI and CQI assuming MRC. If the interference is indicated to be spatially localised the UE derives CSI and CQI assuming weights designed to optimise SINR (e.g. zero forcing).

Additionally or alternatively the secondary station is informed using a flag whether the interference should be assumed to be frequency selective or not. If the interference is indicated not to be frequency selective the UE derives CSI and CQI assuming uniform interference across the frequency domain.

Additionally or alternatively the UE is informed using a flag whether the interference should be assumed to be time varying or not. If the interference is indicated not to be time varying the UE derives CSI and CQI assuming constant interference in the time domain.

Another variant is like the previous example except that the assumption about the spatial characteristics of the interference are indicated to the UE by signalling from the primary station if a particular DRS sequence should be assumed to be in use (e.g. using a bitmap with one bit per DRS sequence). If a DRS sequence is in use the UE may assume that the corresponding channel estimate indicates the spatial signature of the interference associated with that DRS. Otherwise the UE may assume that the channel estimate may be used to estimate the power of a spatially white interference component. In this case the information on DRS use may be sent via the PDCCH when the UE is assigned downlink resources, and can be used to optimise receiver processing of data sent via PDSCH.

In an extension to this variant, the secondary station is informed by signalling from the primary station (e.g. using a bitmap with one bit per DRS sequence) if the DRS sequence should be assumed to be use in the same cell or not.

In a further extension of this variant, the secondary station is informed by signalling from the primary station (e.g. using a bitmap with one bit per DRS sequence) if the DRS sequence should be assumed to be use in a nearby cell or not.

It is to be noted that the primary station may indicate one or more of
- Whether a particular reference sequence should be assumed to be in use
- The number of spatial interference sources
- Whether a particular reference sequence should be assumed to be in use in the same cell
- Whether a particular reference sequence should be assumed to be in use in an adjacent cell
- Whether the interference should be assumed to be uniform across the frequency domain or frequency selective
- Whether the interference should be assumed to be uniform in the time domain or time varying
- The frequency range over which particular assumptions are applicable
- Periodicity of time varying interference
- The time interval over which particular assumptions are applicable The invention is applicable to mobile communication which may include LTE-Advanced. The cells may be located a single base station site, or on different sites, for example femto-cells implemented by fibre radio techniques.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method of operating a primary station for communicating in a mobile network with at least one secondary station, the method comprising performing the acts of:
   in the primary station:
      signaling by a processor via a transceiver and antennas to at least one secondary station, on a downlink channel, an interference status report, wherein the interference status report comprises indications of characteristics of at least some of the interference generated by the mobile network and impacting reception of transmissions from the primary station to the at least one secondary station, the characteristics based on measurements, and wherein the interference status report comprises at least one of:
         a spatial indication being representative of a spatial characteristic of the interference,
         a time indication being representative a temporal characteristic of the interference,
         a frequency indication being representative of a frequency characteristic of the interference, or
         a combination thereof, and
      receiving by the processor via the antennas and transceiver from the at least one secondary station, on an uplink channel an indication of an estimate of an achievable data rate for use by a subsequent transmission from the primary station to the at least one secondary station based on an interpretation of the measured channel characteristics based on the measurements.

2. A method for operating a secondary station for communicating in a mobile network that comprises a primary station and at least one secondary station, the method comprising:
   in the secondary station,
      receiving by a processor via antennas and a transceiver from a primary station on a downlink channel an interference status report, the interference status report comprising indications of characteristics of at least some of the interference generated by a mobile network and impacting reception of transmissions from the primary station to the at least one secondary station, the characteristics based on measurements, wherein the interference status report comprises at least one of:
         a spatial indication being representative of a spatial characteristic of the interference,
         a time indication being representative a temporal characteristic of the interference,
         a frequency indication being representative of a frequency characteristic of the interference, or
         a combination thereof,
      the indications of the channel characteristics being received as reference symbols in the interference report from the primary station,
      interpreting by the processor the channel characteristics of the received interference status report, based on the measurements, and
   transmitting to the primary station an indication on an estimate of an achievable data rate for use by a subsequent transmission from the primary station to the secondary station based on the interpreted channel characteristics based on the measurements.

3. A primary station comprising:
   a plurality of antennas;
   a transceiver configured to communicate in a network with at least one secondary station, the transceiver being communicatively coupled to the plurality of antennas,
   a controller communicatively coupled to the transceiver and configured to:
      transmit via the transceiver and antennas to at least one secondary station, on a downlink channel, an interference status report, the interference status report comprising indications of characteristics of at least some of the interference generated by the mobile network and impacting reception of transmissions from the primary station to the at least one secondary station, the characteristics based on measurements, the interference status report comprising at least one of:
         a spatial indication being representative of a spatial characteristic of the interference,
         a time indication being representative a temporal characteristic of the interference, a frequency indication being representative of a frequency characteristic of the interference, or
a combination thereof, and
receive via the antennas and transceiver from the at least one secondary station an indication of an estimate of an achievable data rate for transmission from the primary station to the secondary station, based on interpreted channel characteristics based on the measurements.

4. The primary station of claim 3, wherein the spatial indication is representative of the spatial distribution of the interference.

5. The primary station of claim 4, wherein the spatial indication indicates whether the interference is spatially uniform or spatially localized.

6. The primary station of claim 4, wherein the spatial indication indicates that the interference is partially spatially uniform and partially spatially localized.

7. The primary station of claim 4, wherein the spatial indication further indicates that the interference is at least partially spatially localized and indicates a number of localized interference sources.

8. The primary station of claim 4, wherein the spatial indication is representative of the direction of at least some of the localized interference sources.

9. The primary station of claim 4, wherein the spatial indication indicates on which sub bands of a frequency domain the interference is spatially uniform.

10. The primary station of claim 4, wherein the spatial indication further comprises an indication on which sub-bands of a frequency domain it is applicable.

11. The primary station of claim 4, wherein the interference report further comprises a validity period during which the interference status report should be considered as valid.

12. The primary station of claim 4, wherein the temporal characteristic of the interference is at least one of, a variation rate of the interference spatial distribution, a periodicity of the interference spatial distribution, a variation rate of the interference, a periodicity of the interference.

13. A secondary station comprising:
a plurality of antennas;
a transceiver configured to communicate in a network with a primary station, the transceiver being communicatively coupled to the plurality of antennas,
a controller communicatively coupled to the transceiver and configured to:
receive an interference status report, via the antennas and transceiver, from the primary station on a downlink channel, wherein the interference status report comprises indications of characteristics of at least some of the interference generated by the mobile network and impacting reception of transmissions from the primary station to the secondary station, the characteristics based on measurements, the interference status report comprising at least one of:
a spatial indication being representative of a spatial characteristic of the interference,
a time indication being representative a temporal characteristic of the interference,
a frequency indication being representative of a frequency characteristic of the interference, or
a combination thereof, and
receive the indications of the channel characteristics as reference symbols, from the primary station
interpret the channel characteristics of the interference status report, the characteristics based on the measurements, and
control the transceiver to transmit, via the antennas, an indication of an estimate of an achievable data rate for transmission from the secondary station to the primary station on an uplink channel, wherein the estimate is based on the interpreted channel characteristics based on the measurements.

14. The secondary station of claim 13, wherein the interference status report comprises a spatial indication being representative of a spatial characteristic of the interference.

15. The secondary station of claim 13, wherein the secondary station computes receiving weights on the basis of at least the interference status report.

16. The secondary station of claim 13, wherein the plurality of antennas of the secondary station receives at least one transmission stream from the primary station and where the at least one transmission stream is a MIMO transmission stream.

17. The secondary station of claim 13, wherein the secondary station computes an indication of an achievable data rate on the basis of at least the interference status report.

18. A tangible computer-readable storage-medium that is not a transitory propagating signal or wave, the medium modified by control information including instructions for performing a method of operating a secondary station for communicating in a mobile network that comprises a primary station and at least one secondary station, the method comprising:
in the secondary station:
receiving by a processor from a primary station via antennas and a transceiver, on a downlink channel, an interference status report, the interference status report comprising indications of characteristics of at least some of the interference generated by a mobile network impacting reception of transmissions from the primary station to the at least one secondary station, the characteristics based on measurements, and wherein the interference status report comprises at least one of:
a spatial indication being representative of a spatial characteristic of the interference,
a time indication being representative a temporal characteristic of the interference,
a frequency indication being representative of a frequency characteristic of the interference, or
a combination thereof,
the indications of the characteristics being received as reference symbols in the interference status report from the primary station,
interpreting by the processor the channel characteristics of the received interference status report, and
transmitting to the primary station an indication of an estimate of an achievable data rate for use by a subsequent transmission from the primary station to the secondary station based on the interpreted channel characteristics based on the measurements.

19. A tangible computer-readable storage-medium that is not a transitory propagating signal or wave, the medium modified by control information including instructions for performing a method of operating a primary station for communicating in a mobile network that comprises a primary station and at least one secondary station, the method comprising:
in the primary station:
signaling by a processor via a transceiver and antennas, to the at least one secondary station on a downlink channel, an interference status report, wherein the interference status report comprises indications of characteristics of at least some of the interference generated by the mobile network and impacting reception of transmissions from the primary station to the at least one secondary station, the characteristics based on measurements, and wherein the interference status report comprises at least one of:
- a spatial indication being representative of: a spatial characteristic of the interference,
- a time indication being representative a temporal characteristic of the interference,
- a frequency indication being representative of a frequency characteristic of the interference, or
- a combination thereof, and receiving by the processor via the antennas and transceiver, from the at least one secondary station, on an uplink channel, an indication of an estimate of an achievable data rate for use by a subsequent transmission from the primary station to the at least one secondary station based on an interpretation of the channel characteristics based on the measurements.

* * * * *